United States Patent
Prakah-Asante et al.

(10) Patent No.: US 9,643,471 B2
(45) Date of Patent: May 9, 2017

(54) DRIVER PERSONALIZED CLIMATE CONDITIONING

(75) Inventors: Kwaku O. Prakah-Asante, Commerce Township, MI (US); Jialiang Le, Canton, MI (US); Manoharprasad K. Rao, Novi, MI (US); Gary S. Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1444 days.

(21) Appl. No.: 13/430,776

(22) Filed: Mar. 27, 2012

(65) Prior Publication Data

US 2013/0255930 A1    Oct. 3, 2013

(51) Int. Cl.
*B60H 1/00* (2006.01)

(52) U.S. Cl.
CPC ..... *B60H 1/00742* (2013.01); *B60H 1/00807* (2013.01); *B60H 1/0075* (2013.01)

(58) Field of Classification Search
CPC ............ B60H 1/00742; B60H 1/00807; B60H 2001/00992
See application file for complete search history.

(56) References Cited

U.S. PATENT DOCUMENTS

| | | | |
|---|---|---|---|
| 5,145,112 A | | 9/1992 | Ueda |
| 5,172,856 A | * | 12/1992 | Tanaka .................. G05D 23/27 236/49.3 |
| 5,187,943 A | * | 2/1993 | Taniguchi .......... B60H 1/00742 236/49.3 |
| 5,400,964 A | | 3/1995 | Freiberger |
| 5,682,329 A | * | 10/1997 | Seem ................... F24F 11/0086 236/49.5 |

(Continued)

FOREIGN PATENT DOCUMENTS

| | | | |
|---|---|---|---|
| DE | 102015206955 A1 | * 10/2016 | ............... G01J 5/00 |
| JP | 2006106952 | 4/1994 | |

(Continued)

OTHER PUBLICATIONS

Kuang C. Wei et al., An Intelligent Automotive Climate Control System, 0-7803-2559-1/95 © 1995 IEEE, pp. 2977-2982.

*Primary Examiner* — Len Tran
*Assistant Examiner* — Alexis Cox
(74) *Attorney, Agent, or Firm* — Vichit Chea; MacMillan, Sobanski & Todd, LLC

(57) ABSTRACT

An HVAC system for a vehicle includes a skin temperature sensor for measuring an actual skin temperature of the driver and a cabin temperature sensor for measuring an actual cabin temperature of ambient air within the passenger cabin. A controller module stores a target cabin temperature. The controller module controls the HVAC system according to a first error between the target cabin temperature and the actual cabin temperature. The actual cabin temperature is filtered according to a first time constant. A personalization module stores a target skin temperature, and the personalization module determines an offset to be applied to the target cabin temperature according to a second error between the target skin temperature and the actual skin temperature. The actual skin temperature is filtered according to a second time constant longer than the first time constant.

22 Claims, 4 Drawing Sheets

(56) References Cited

U.S. PATENT DOCUMENTS

| | | | | |
|---|---|---|---|---|
| 6,213,404 B1* | 4/2001 | Dushane | | F24D 19/10 |
| | | | | 165/205 |
| 6,659,358 B2 | 12/2003 | Kamiya et al. | | |
| 7,188,668 B2 | 3/2007 | Hara et al. | | |
| 7,246,656 B2 | 7/2007 | Ichishi et al. | | |
| 7,918,100 B2 | 4/2011 | Breed et al. | | |
| 9,151,510 B2* | 10/2015 | Leen | | F24F 11/006 |
| 2001/0039806 A1* | 11/2001 | Kawai | | G01K 1/026 |
| | | | | 62/229 |
| 2004/0089006 A1* | 5/2004 | Kamiya | | B60H 1/00028 |
| | | | | 62/244 |
| 2004/0261989 A1* | 12/2004 | Hara | | B60H 1/00742 |
| | | | | 165/202 |
| 2005/0103488 A1* | 5/2005 | Ichishi | | B60H 1/00792 |
| | | | | 165/202 |
| 2006/0235753 A1* | 10/2006 | Kameyama | | B60H 1/00742 |
| | | | | 705/15 |
| 2007/0114292 A1* | 5/2007 | Breed | | B60H 1/00742 |
| | | | | 236/49.3 |
| 2008/0073057 A1* | 3/2008 | Kojima | | B60H 1/00735 |
| | | | | 165/43 |
| 2008/0168787 A1* | 7/2008 | Kameyama | | B60H 1/00285 |
| | | | | 62/244 |
| 2009/0140060 A1* | 6/2009 | Stoner | | G05D 23/1934 |
| | | | | 236/51 |
| 2010/0025585 A1* | 2/2010 | Taguchi | | A61B 5/0059 |
| | | | | 250/339.13 |
| 2013/0069865 A1* | 3/2013 | Hart | | G06F 3/1454 |
| | | | | 345/156 |
| 2015/0025738 A1* | 1/2015 | Tumas | | B60H 1/00742 |
| | | | | 701/36 |
| 2015/0102114 A1* | 4/2015 | McFarland | | F24F 11/0012 |
| | | | | 236/44 A |
| 2016/0016454 A1* | 1/2016 | Yang | | B60R 16/037 |
| | | | | 701/36 |

FOREIGN PATENT DOCUMENTS

| | | |
|---|---|---|
| JP | 2004330865 | 11/2004 |
| JP | 2004359130 | 12/2004 |
| JP | 2006298014 | 11/2006 |

* cited by examiner

DRIVER PERSONALIZED CLIMATE CONDITIONING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to heating, ventilating, and air conditioning (HVAC) systems for transportation vehicles, and, more specifically, to personalized control of an HVAC system based on skin temperature of an occupant or driver of the vehicle.

HVAC systems control the climate in transportation vehicles such as automobiles in order to maintain thermal comfort of the vehicle occupants. Typically, a blower passes air through heat exchangers and delivers conditioned air to various points within the passenger cabin. Warm air may be provided by a heater core obtaining heat from coolant flowing in a combustion engine, for example. Cool air may be obtained from a conventional air conditioning system having a motor driven compressor and an evaporator.

The simplest climate control systems in motor vehicles provide the occupant with direct control of the intensity of heating or cooling, the operating speed of the blower, and the relative amount of air flow going to different registers. This requires the user to continually monitor and adjust the climate control settings in order to remain comfortable.

Automatic temperature control systems have also been introduced wherein a feedback control system monitors ambient air temperature within the passenger compartment and automatically adjusts blower speed and heater core or air conditioning operation to maintain a desired temperature setting. In some vehicles, multiple zones have been implemented with separate automatic temperature control with individual target temperature settings being made for each zone.

The foregoing types of HVAC systems only indirectly control the actual skin temperature of an occupant. Because skin temperature is a better indicator of actual occupant comfort, systems have been investigated for regulating HVAC system operation based on the skin temperature of the vehicle occupants. However, the thermodynamic environment in a vehicle interior is complex, as are the relationships between various HVAC control settings and the resulting effect on skin temperature of different occupants. Therefore, previous systems have been relatively complex and not cost effective.

SUMMARY OF THE INVENTION

The present invention obtains personalized climate control that is tailored to one occupant in the vehicle, such as the driver. Instead of directly attempting to regulate the skin temperature of the occupant, certain adjustments are made to the target cabin temperature for controlling the HVAC so that operation is only partially controlled in response to skin (i.e., body) temperature. Certain limitations are placed on the adjustments in order to ensure stable system operation.

In one aspect of the invention, apparatus is provided in a transportation vehicle operated by a driver within a passenger cabin comprising skin temperature sensor for measuring an actual skin temperature of the driver and a cabin temperature sensor for measuring an actual cabin temperature of ambient air within the passenger cabin. An HVAC system provides heated and cooled air flow into the passenger cabin. A controller module stores a target cabin temperature, wherein the controller module controls the HVAC system according to a first error between the target cabin temperature and the actual cabin temperature. The actual cabin temperature is filtered according to a first time constant. A personalization module stores a target skin temperature, wherein the personalization module determines an offset to be applied to the target cabin temperature according to a second error between the target skin temperature and the actual skin temperature. The actual skin temperature is filtered according to a second time constant longer than the first time constant.

DETAILED DESCRIPTION OF PREFERRED EMBODIMENTS

Figure 1:
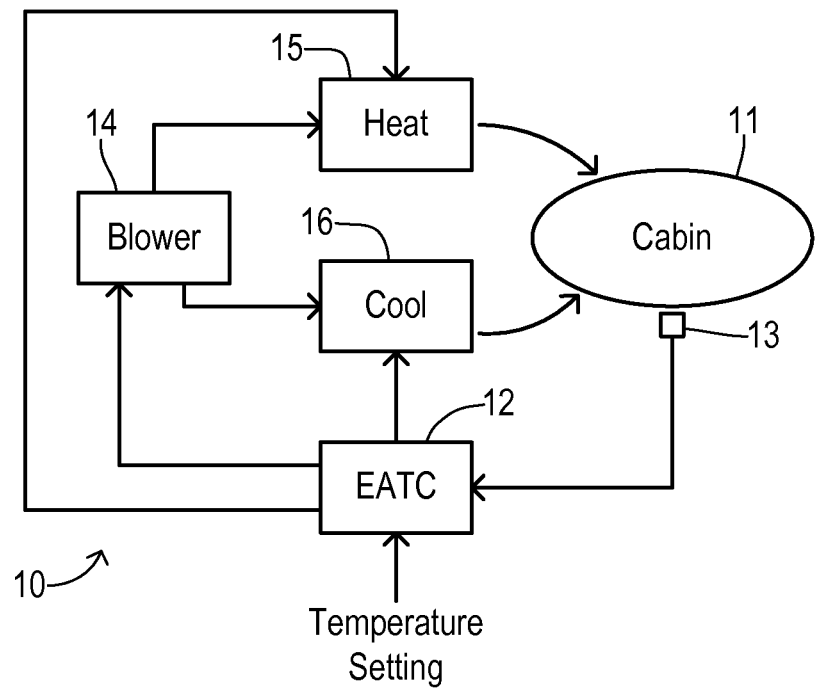
FIG. 1 is a block diagram of an HVAC system with automatic temperature control.

Referring now to FIG. 1, a prior art electronic automatic temperature control (EATC) system 10 is shown for providing climate control in a passenger cabin 11 of a transportation vehicle. An EATC controller 12 receives ambient air temperature measurements from a sensor 13 disposed in cabin 11. Using feedback control, EATC 12 determines operation of a blower 14, a heat source 15, and a cool source 16. The temperature sensing, blower, heating, and cooling functions may be duplicated according to respective zones in cabin 11 to implement a multi-zone climate control system as known in the art.

The present invention builds upon the EATC system of FIG. 10 by adding a personalization function for adjusting the EATC temperature setpoint in order to improve comfort of a single occupant in a particular climate-controlled zone. The personalization function it provided "on-demand". It may typically be selected whenever the occupant is alone in the vehicle or in a particular zone. In a transportation vehicle, many trips are made with only a driver present. During such times, altering operation of the EATC system for optimizing comfort of the driver may be highly desirable since it may also achieve energy savings.

Figure 2:
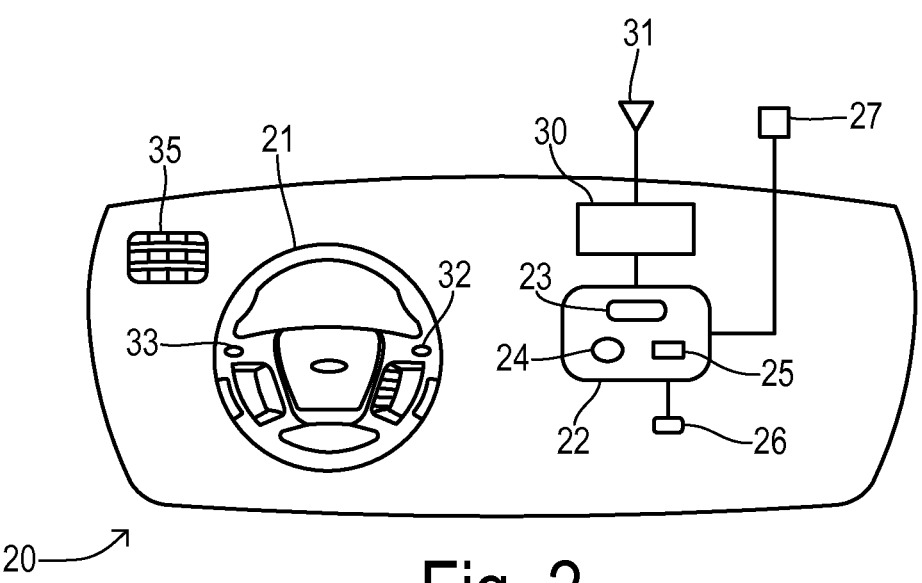
FIG. 2 is a schematic and block diagram of portions of an HVAC system and controller of the present invention.

A system of the present invention is shown in greater detail in FIG. 2. Within a passenger cabin 20, a steering wheel 21 resides in front of a driver. A user interface 22 typically mounted on an instrument panel may include an information display 23, an adjustment knob 24, and function push buttons 25. An ambient air temperature sensor 26 measures cabin temperature in a conventional manner. An external temperature sensor 27 may be mounted outside of the passenger cabin to determine a temperature outside the vehicle. To obtain a preview temperature and/or as an alternative means for obtaining outside temperature, a wireless communication system 30 and antenna 31 are provided as further described below.

In order to obtain skin temperature measurements of the driver, a pair of infrared temperature sensors 32 and 33 is mounted on steering wheel 21. Heated or cooled air flow is provided onto the driver from various registers, including a register 35.

Figure 3:
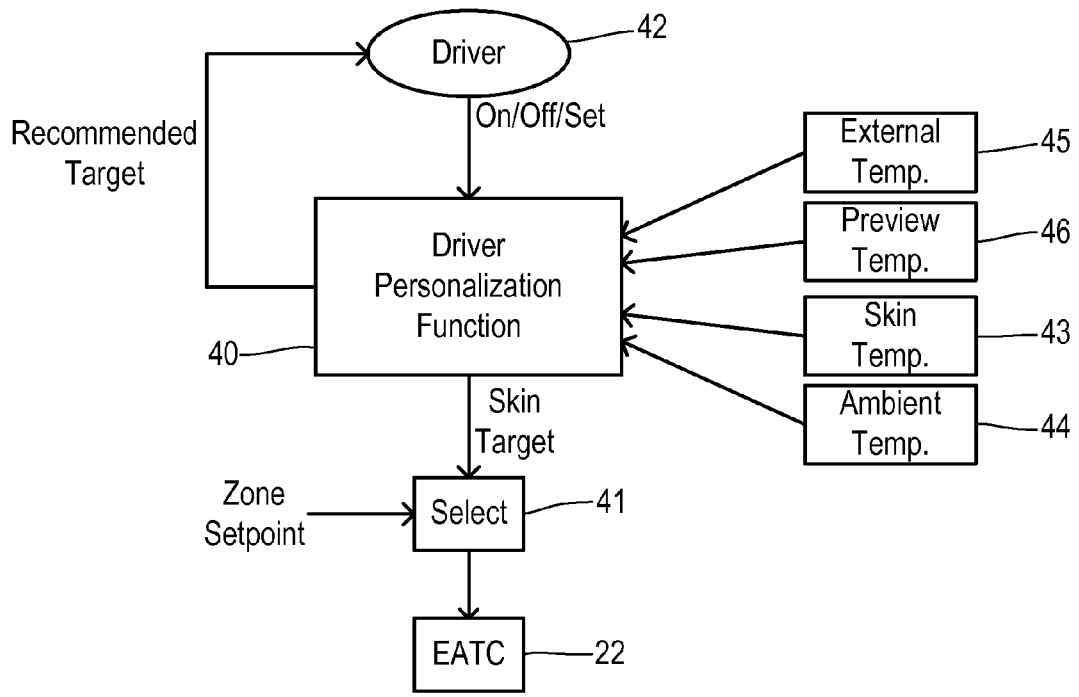
FIG. 3 is a block diagram showing the present invention in greater detail.

Control apparatus for performing the present invention is shown in greater detail in FIG. 3. A driver personalization function 40 is implemented as a module interacting with controller module 22 of the automatic temperature control. Module 40 may be a software module executed on the same electronic programmable microcontroller within EATC 22 or may be executed by a device in a separate box. A skin temperature target command is provided from driver personalization function 40 to EATC 22 via a selector switch 41 (i.e., a driver-operated switch for choosing between a conventionally provided zone setpoint temperatures or a personalization mode using the skin target command). As further described below, driver personalization function 40 provides a recommended target for the driver's skin temperature. The personalization function is controlled by driver 42 who adjusts the user interface to turn function 40 on or off. When personalization is desired, driver 42 evaluates the recommended target and either adopts that temperature or enters a different one via the user interface.

Driver personalization function 40 receives various temperature measurements including skin temperature 43, ambient internal (i.e., cabin) temperature 44, ambient external air temperature 45, and a preview temperature 46. Preview temperature 46 may correspond to upcoming external temperature conditions based on 1) current or future temperature measurements at a destination toward which the vehicle is being driven, or 2) a short-term temperature forecast for the vicinity of the vehicle. These preview temperatures may be received from a remote service provider via the wireless communication system. Based on known models relating various temperature conditions to the personal feeling of comfort according to a person's skin temperature, personalization function 40 derives a recommended skin target temperature based on known physical/perceptual models.

Figure 4:
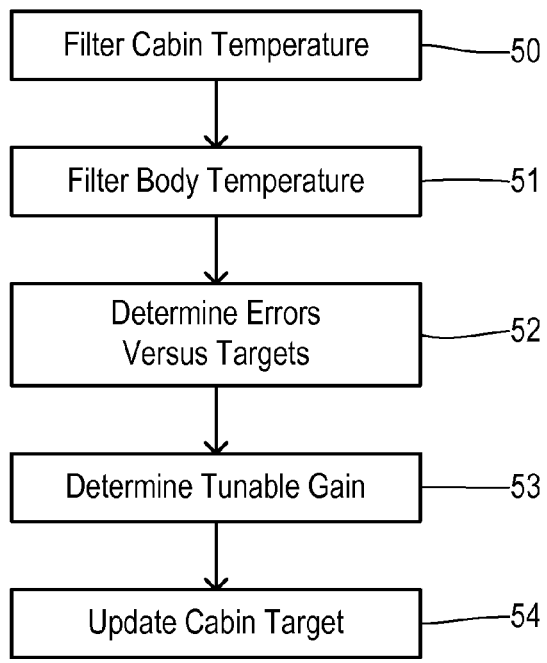
FIG. 4 is a flowchart of a preferred method of the invention.

Using a target skin temperature derived from FIG. 3, operation of the HVAC control system is modified in one preferred embodiment according to the method shown in FIG. 4. When in the personalization mode to optimize the climate control according to the skin temperature of an occupant, an improved feedback control proceeds based on both a body (i.e., skin) temperature and a cabin temperature. To ensure stability of the feedback control system, the controller is made to be more sensitive to changes in cabin temperature than changes in body temperature. Thus, cabin temperature measurements are filtered in step 50 according to a first time constant. Body temperature measurements are filtered in step 51 according to a second time constant longer than the first time constant. In step 52, the errors between the filtered (e.g., averaged) temperature measurements and their respective target temperatures are determined. Based on the magnitude of the errors, a tunable gain factor is determined in step 53 for computing an offset to be applied to the cabin temperature target. The cabin target temperature is updated in step 54, and then conventional HVAC system operation proceeds using the modified target for feedback control of the cabin temperature.

The signal processing and decision making performed in FIG. 4 may proceed as follows. Filtering of the body temperature and cabin temperature is performed according to the following equations:

$$\overline{CT_k} = \alpha_{CT}\overline{CT_{k-1}} + (1-\alpha_{CT})CT_k$$

$$\overline{BT_k} = \alpha_{BT}\overline{BT_{k-1}} + (1-\alpha_{BT})BT_k$$

where CT is actual cabin temperature, $\alpha_{CT}$ is the filter gain between 0 and 1 which defines the first time constant, BT is actual skin temperature, $\alpha_{BT}$ is the filter gain that defines the second time constant, and k is an index. The first error is determined in accordance with a formula:

$$CT_{err}(k) = CT_{tar}(k) - \overline{CT_k}$$

where $CT_{err}$ is the first error and $CT_{tar}$ is the target cabin temperature (i.e., that is used by the EATC as the feedback target). The second error is determined in accordance with a formula:

$$BT_{err}(k) = BT_{tar}(k) - \overline{BT_k}$$

where $BT_{err}$ is the second error and $BT_{tar}$ is the target skin temperature. An updated target cabin temperature (i.e., after incrementing index k by one) is determined in accordance with a formula:

$$CT_{tar}(k) = CT_{tar}(k-1) + K_1 BT_{err}(k)$$

where $K_1$ is the tunable gain factor for a normalized gain factor between 0 and 1. The magnitude of $BT_{err}$ is applied if the tunable normalized $K_1$ range is between −1 to 1 to provide appropriate directional offsets to the cabin temperature.

Figure 5:
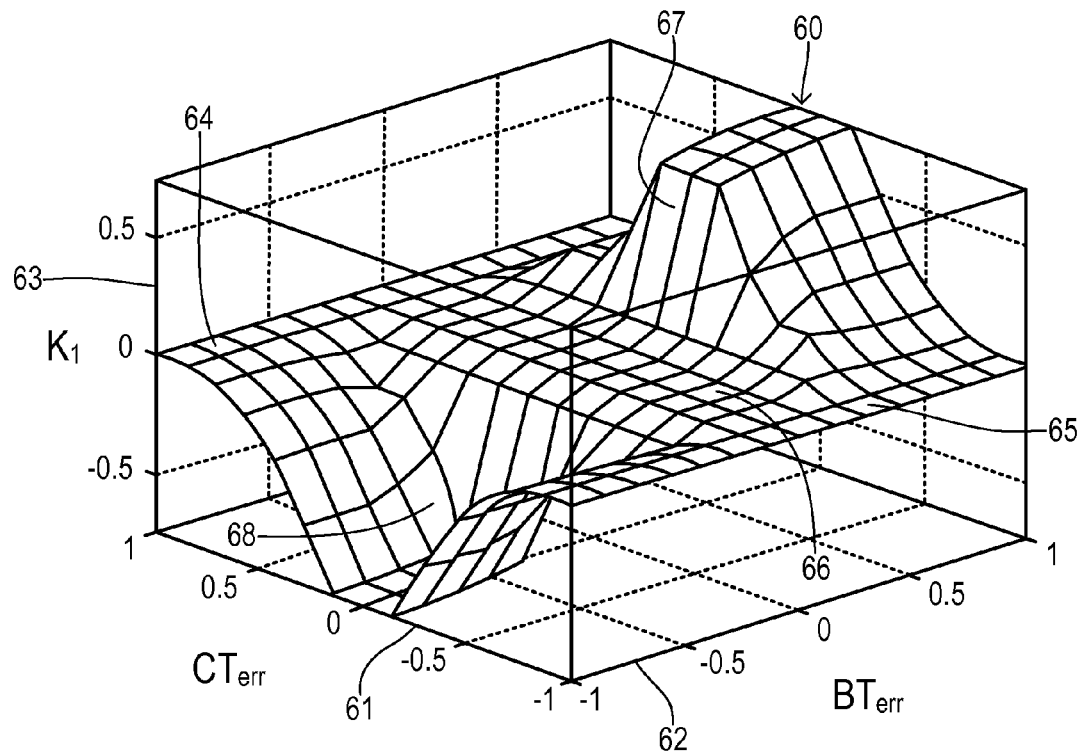
FIG. 5 is a graph showing a mapping used to determine a gain factor.

A rule-base is provided for the value of gain factor $K_1$ which is designed to limit the amount of change at each iteration and to prevent changes during times when the cabin temperature error is more than a threshold difference (e.g., 5° F.). One embodiment for the rule base for the invention is shown as a normalized surface plot in FIG. 5 for mapping the errors to a value of $K_1$. Thus, a value for the gain factor $K_1$ is represented as a three-dimensional surface map 60 defining the value of $K_1$ for various values of the cabin temperature error along axis 61, body temperature error along axis 62, and the $K_1$ value along axis 63. In this embodiment, for the normalized gain factor between −1 to 1, the output cabin temperature change is determined according to the formula:

$$CT_{tar}(k) = CT_{tar}(k-1) + K_1 |BT_{err}(k)|$$

The magnitudes for the cabin temperature error and body temperature error are shown with respect to a normalized scale between 1 and −1 representing thresholds within which the personalization function is allowed to operate. Near the thresholds, the value of K is zero in order to prevent operation of the personalization function. For example, at high values of cabin temperature error along regions 64 and 65 of surface 60 the value of $K_1$ approaches zero. Likewise, when the body temperature error is close to zero, surface 60 is at a zero value as shown at region 66. When the value of cabin temperature error is close to zero, but body temperature error is between upper and lower thresholds, increasingly larger values of gain factor $K_1$ are represented as shown in regions 67 and 68.

Instead of a mapping, the controller can alternatively use a numerical relationship for determining the gain factor.

Such a relationship can be stated generally as $K_1=f(CT_{err}, BT_{err})$. Suitable equations defining this function are designed according to the desired properties for a particular vehicle, but would produce a gain factor similar to the mapping shown in FIG. 5. Using the resulting value of $K_1$ from such equations, an offset delta_$CT_{tar}$ is then calculated as follows:

$$\text{delta\_CT}_{tar}(k)=K_1 BT_{err}(k)$$

for normalized gain factors between 0 and 1, and $$\text{delta\_CT}_{tar}(k)=K_1|BT_{err}(k)|$$

with a normalized $K_1$ range between −1 to 1. So that the personalization function does not impair overall performance of the temperature control system and to ensure stability of operation, the offset is further modified according to the following limits:

$$\text{delta\_CT}_{tar} = \begin{cases} 0 & \text{if } \{|CT_{err}| > \delta_{thres}\} \\ 0 & \text{if } \{|BT_{err}| > \alpha_{thres}\} \\ \text{delta\_CT}_{tar} & \text{if } \{(\beta_{thres} < |CT_{err}| \leq \delta_{thres}) \\ & \text{and } \{(\lambda_{thres} < |BT_{err}| \leq \alpha_{thres})\} \\ 0 & \text{otherwise} \end{cases}$$

where $\delta_{thres}$ is an upper-bound for $CT_{err}$, $\beta_{thres}$ is an lower-bound for $CT_{err}$, $\alpha_{thres}$ is an upper-bound for $BT_{err}$, and $\lambda_{thres}$ is an lower-bound for $BT_{err}$. The thresholds prevent the personalization function from introducing modifications whenever either of the errors are too small or too big, thereby ensuring stability and avoiding undesirable interactions.

Figure 6:
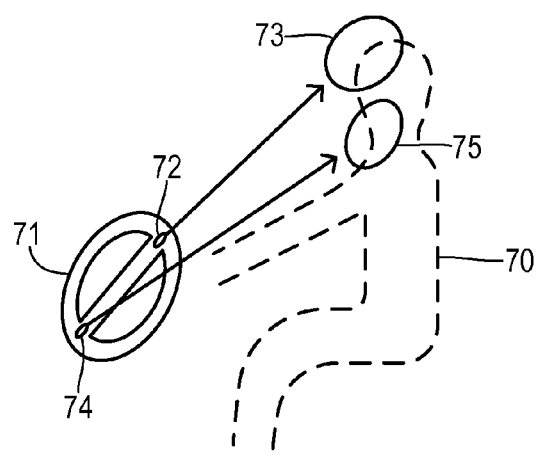
FIG. 6 shows a first embodiment of relative orientations of infrared temperature sensors on a steering wheel directed toward a driver.

In order to obtain robust skin temperature measurements, detection regions of the infrared temperature sensors mounted on the steering wheel may be provided as shown in FIG. 6. A person 70 residing in a particular seating location (such as a driver's seat) has their face located in relation to temperature sensors 72 and 74 on steering wheel 71 in dependence on their height or posture. For a non-driving seating position, sensors 72 and 74 may be placed on other convenient surfaces such as an instrument panel or a roof panel where they can be directed toward the expected area where the occupants face would reside. Infrared sensor 72 has a detection region 73 and infrared sensor 74 has a detection region 75 which are directed at slightly different heights and laterally spaced toward the right and left sides of the face of person 70, respectively. Using detection regions at slightly different heights and slightly different lateral regions, the likelihood of at least one temperature measurement coinciding with the face of a driver of unknown height is increased.

Figure 7:
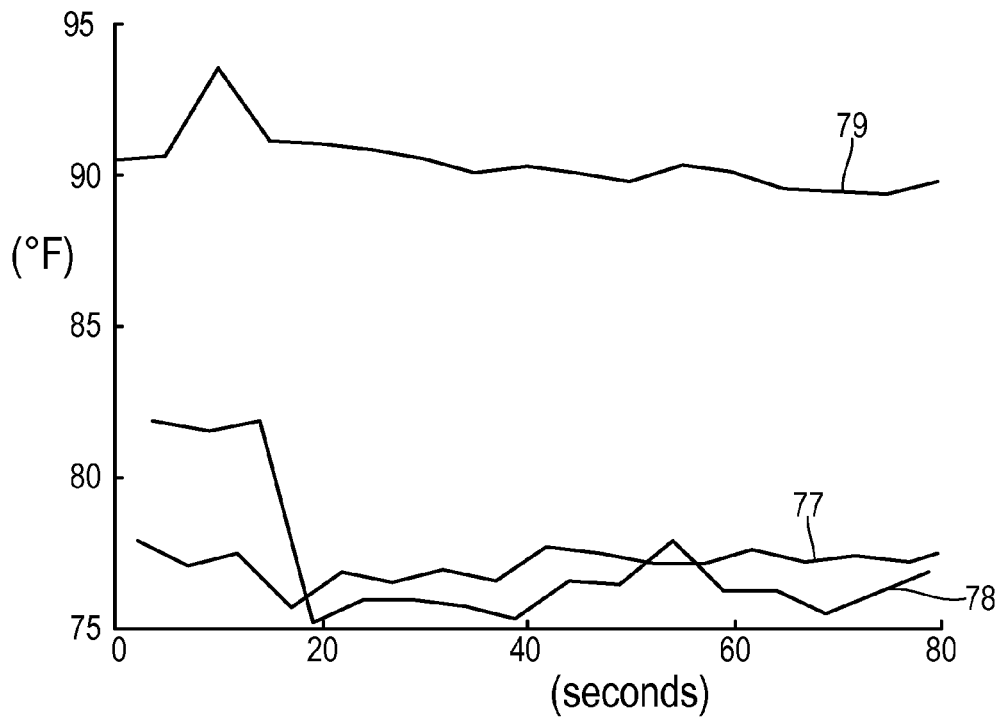
FIG. 7 is a graph showing sample temperature data.

The temperature measurements are evaluated to ensure that the sensor obtaining the better skin temperature measurement is utilized as shown in FIG. 7. Line 77 represents an ambient air temperature measurement as obtained within the passenger cabin. Line 78 represents temperature measurements obtained from one infrared sensor and line 79 represents temperature measurements obtained from the other infrared sensor. During substantially all relevant thermal conditions that may be present within the vehicle, the infrared sensor not collecting an accurate skin temperature measurement will closely track the ambient air temperature as shown by the close correspondence of lines 77 and 78. A sensor accurately characterizing the driver's skin temperature produces a distinctly different measurement from the ambient air temperature measurement. This is because normal skin temperature of the person's face is higher than a typical target temperature of cabin air and is usually different from the ambient air temperature even before the HVAC system reaches thermal equilibrium. Thus, by comparing each of the first and second temperature measurements from the infrared sensors with the actual cabin temperature, the temperature that deviates the most from actual cabin temperature can be selected as being an actual body temperature.

Figure 8:
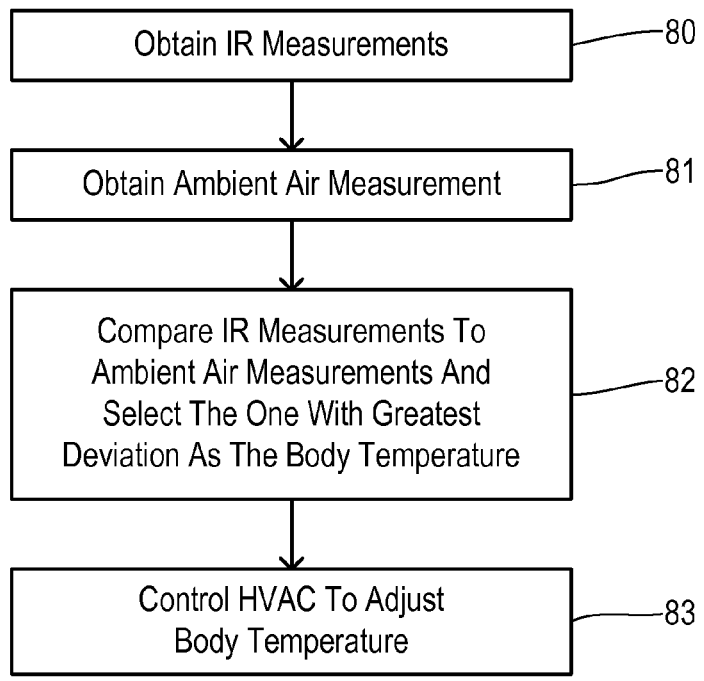
FIG. 8 is a flowchart showing a preferred method for determining a skin temperature of a person in a vehicle.

As shown in FIG. 8, infrared measurements are obtained in step 80. Ambient air temperature is measured in step 81. In step 82, the infrared measurements are compared to ambient air measurements and the one with the greatest deviation is selected as the body temperature. In step 83, the HVAC system is controlled in a suitable manner to adjust the body temperature using an appropriate type of feedback control.

What is claimed is:

1. Apparatus in a transportation vehicle occupied by a person within a passenger cabin, comprising:
a skin temperature sensor for measuring an actual skin temperature of the person;
a cabin temperature sensor for measuring an actual cabin temperature of ambient air within the passenger cabin;
an HVAC system with a heat source and a cool source for providing heated and cooled air flow into the passenger cabin;
a controller module storing a target cabin temperature, wherein the controller module is configured to control the heat source and cool source to reduce a first error between the target cabin temperature and an averaged actual cabin temperature, wherein the controller module is configured to average the actual cabin temperature using a first averaging filter with a first time constant; and
a personalization module storing a target skin temperature, wherein the personalization module is configured to apply an offset to the target cabin temperature used to determine the first error according to a second error between the target skin temperature and an averaged actual skin temperature, wherein the personalization module is configured to average the actual skin temperature using a second averaging filter with a second time constant longer than the first time constant.

2. The apparatus of claim 1 wherein the offset is zero when a difference between the target cabin temperature and the averaged actual cabin temperature is greater than a first threshold.

3. The apparatus of claim 1 wherein the offset is comprised of the second error multiplied by a gain factor.

4. The apparatus of claim 3 wherein the gain factor is a function of corresponding magnitudes of the first error and the second error.

5. The apparatus of claim 3 further comprising a map for correlating corresponding magnitudes of the first error and the second error with a value for the gain factor.

6. The apparatus of claim 1 wherein the averaged actual cabin temperature is determined in accordance with a formula $$\overline{CT_k}=\alpha_{CT}\overline{CT_{k-1}}+(1-\alpha_{CT})CT_k$$

where CT is actual cabin temperature, $\alpha_{CT}$ is the filter gain between 0 and 1 which defines the first time constant, and k is an index.

7. The apparatus of claim 1 wherein the averaged actual skin temperature is determined in accordance with a formula $$\overline{BT_k} = \alpha_{BT}\overline{BT_{k-1}} + (1-\alpha_{BT})BT_k$$

where BT is actual skin temperature, $\alpha_{BT}$ is the filter gain between 0 and 1 which defines the second time constant, and k is an index.

8. The apparatus of claim 1 wherein the averaged actual cabin temperature is determined in accordance with a formula $$\overline{CT_k} = \alpha_{CT}\overline{CT_{k-1}} + (1-\alpha_{CT})CT_k$$

where CT is actual cabin temperature, $\alpha_{CT}$ is the first time constant, and k is an index;
  wherein the averaged actual skin temperature is determined in accordance with a formula $$\overline{BT_k} = \alpha_{BT}\overline{BT_{k-1}} + (1-\alpha_{BT})BT_k$$

where BT is actual skin temperature and $\alpha_{BT}$ is the second time constant;
  wherein the first error is determined in accordance with a formula $$CT_{err}(k) = CT_{tar}(k) - \overline{CT_k}$$

where $CT_{err}$ is the first error and $CT_{tar}$ is the target cabin temperature;
  wherein the second error is determined in accordance with a formula $$BT_{err}(k) = BT_{tar}(k) - \overline{BT_k}$$

where $BT_{err}$ is the second error and $BT_{tar}$ is the target skin temperature; and
  wherein an updated target cabin temperature is determined in accordance with a formula $$CT_{tar}(k) = CT_{tar}(k-1) + K_1 BT_{err}(k)$$

where $K_1$ is the gain factor.

9. The apparatus of claim 1 wherein the skin temperature sensor is comprised of an infrared sensor mounted in a steering wheel of the vehicle and directed toward a face of the person.

10. The apparatus of claim 1 wherein the skin temperature sensor is comprised of first and second infrared sensors mounted in a steering wheel of the vehicle and directed toward a left-side and a right-side of a face of the person, respectively, and wherein the personalization module compares temperature measurements from the infrared sensors with the measured actual cabin temperature to determine the actual skin temperature.

11. The apparatus of claim 1 further comprising a user interface, wherein the target cabin temperature is determined using a manual user setting selected via the user interface.

12. The apparatus of claim 1 further comprising a user interface, wherein the target skin temperature is determined using a manual user setting selected via the user interface.

13. The apparatus of claim 12 wherein the personalization module calculates a recommended skin temperature and displays the recommended skin temperature via the user interface.

14. The apparatus of claim 13 further comprising a wireless communication device for obtaining a preview external air temperature, wherein the recommended skin temperature is calculated in response to the preview external air temperature.

15. The apparatus of claim 1 wherein the controller module and the personalization module are integrated in a programmable microcontroller.

16. A method of controlling heated and cooled air flow from an HVAC system into a passenger cabin of a transportation vehicle occupied by a person, comprising the steps of:
  measuring an actual skin temperature of the person;
  measuring an actual cabin temperature of ambient air within the passenger cabin;
  storing a target cabin temperature;
  averaging the actual cabin temperature according to a first time constant;
  controlling a heat source and a cool source of the HVAC system to reduce a first error between the target cabin temperature and the averaged actual cabin temperature;
  storing a target skin temperature;
  averaging the actual skin temperature according to a second time constant longer than the first time constant; and
  determining an offset for updating the target cabin temperature according to a second error between the target skin temperature and the averaged actual skin temperature.

17. The method of claim 16 wherein the offset is zero when the first error between the target cabin temperature and the averaged actual cabin temperature is greater than a first threshold.

18. The method of claim 16 wherein the offset is determined in response to the second error multiplied by a gain factor.

19. The method of claim 18 further comprising the step of determining the gain factor as a function of corresponding magnitudes of the first error and the second error.

20. The method of claim 19 wherein a map correlates corresponding magnitudes of the first error and the second error with a value for the gain factor.

21. The method of claim 16 further comprising the steps of:
  determining an external air temperature outside the passenger cabin;
  calculating a recommended skin temperature in response to the external air temperature and the actual cabin temperature; and
  displaying the recommended skin temperature to the person via a user interface.

22. The method of claim 16 further comprising the steps of:
  receiving a preview external air temperature via a wireless communication system;
  calculating a recommended skin temperature in response to the preview external air temperature and the actual cabin temperature; and
  displaying the recommended skin temperature to the person via a user interface.

* * * * *